Jan. 8, 1952     L. M. STEMPEL     2,581,455
ADJUSTABLE BEARING DEVICE
Filed May 28, 1948
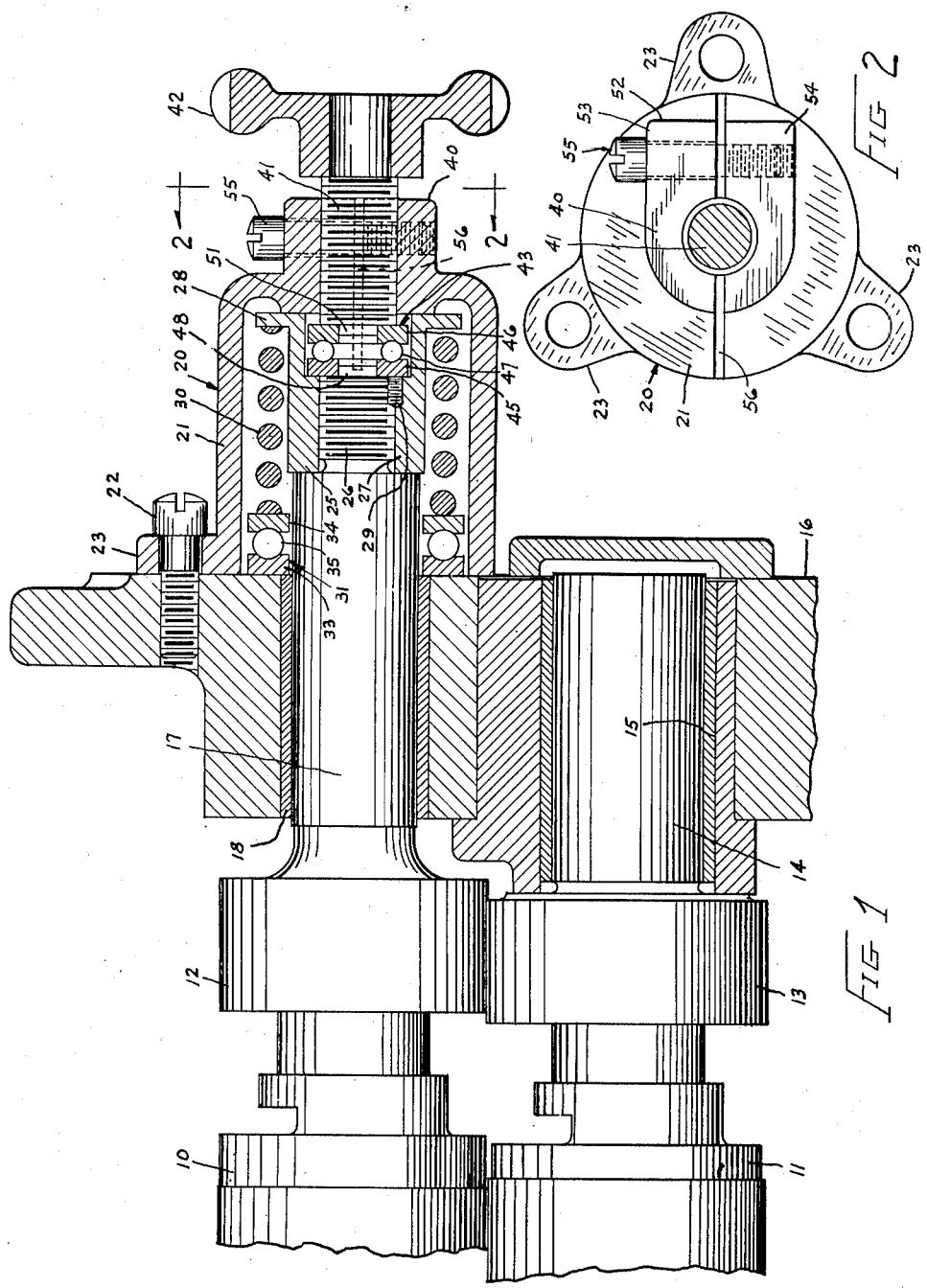
INVENTOR.
Laszlo M. Stempel
BY
Mason, Kolte, Crews & Berry
ATTORNEYS Patented Jan. 8, 1952

2,581,455

UNITED STATES PATENT OFFICE 2,581,455

ADJUSTABLE BEARING DEVICE

Laszlo M. Stempel, New York, N. Y., assignor to Laszlo M. Stempel, New York, and Albert Charles Nolte, Plandome, N. Y., as joint trustees Application May 28, 1948, Serial No. 29,832

11 Claims. (Cl. 308—233)

The present invention relates to an adjustable bearing device of the type operable to effect lengthwise adjustment of a shaft or cylinder and although it has a wide range of utility, it is especially useful in connection with rotary presses to obtain accurate transverse registry of a printing cylinder, as for example, in multi-color work, without stopping the press.

The object in general of the present invention is to provide a new and improved adjustable bearing device of the general type described, which is comparatively simple and inexpensive to manufacture but which is nevertheless rugged and durable, which is convenient and easy to operate, which is adapted to effect adjustments with extreme accuracy and which can be locked to maintain adjusted conditions.

Various other objects of the invention are apparent from the following particular description and from an inspection of the accompanying drawings, in which Fig. 1 is a view partly in front elevation and partly in longitudinal section of a pair of coacting printing cylinders with an adjustable bearing device for one of said cylinders embodying the present invention; and Fig. 2 is an end view of the adjustable bearing.

The invention is shown in its application to a plate cylinder 10 of a rotary printing press coacting with a blanket cylinder 11. The two cylinders have respective bearers 12 and 13 at each end in rolling contact to prevent movements of said cylinders radially towards each other.

The blanket cylinder 11 is shown with a gudgeon or shaft 14 at one end supported in suitable bearings 15 in a side frame 16 of the press. A similar bearing support may be provided for the other end of the blanket cylinder 11.

The plate cylinder 10 has a gudgeon or shaft 17 at one end supported in a bearing 18 in a side frame 16 and a gudgeon or shaft (not shown) at the other end similarly supported in the other side frame (not shown). This shaft 17 cooperates at its outer end with an adjustable thrust bearing device 20 embodying the present invention. This thrust bearing device 20 comprises a housing 21 removably secured to the frame 16 by studs 22 which pass through respective lugs 23 radiating from said housing and which are threaded into said frame. The shaft 17 projects beyond the bearing 18 and into the housing 21 and at its outer end carries a spring pressure member 25 rotatable therewith. For retaining this spring pressure member 25 on to the outer end of the shaft 17, said shaft has an axial screw extension 26 of reduced diameter and said pressure member has a cylinder sleeve section 27, which is threaded on to said extension and retained in position by a screw 29 and which is provided at its outer end with a flange ring 28. A coil spring 30 located in the housing 21 and arranged around the end portion of the shaft 17 and the sleeve 27, has its outer end pressing against the flange ring 28 and its inner end pressing against an anti-friction thrust bearing 31. This spring thrust bearing 31 comprises a pair of opposed races 33 and 34 containing therebetween an annular row of anti-friction rolling elements 35. One of the races 33 is affixed against rotation to the frame 16, while the other race 34 against which the spring 30 presses is free to rotate with said spring.

With the arrangement so far described, the plate cylinder 10 is urged axially towards the right by the action of the spring 30. In order to limit the extent of axial movement of the cylinder 10 to the right by the action of the spring 30, the housing 21 is provided with an axial boss 40 through which an adjusting screw 41 is threaded. This screw 41 has fastened to its outer end a handle or handwheel 42 by which it may be rotated and at its inner end engages an anti-friction thrust bearing 43 for the shaft 17. This thrust bearing 43 is retained in the outer end of the sleeve 27, the bore of said sleeve at this end being enlarged in diameter to house said bearing.

The thrust bearing 43 comprises a pair of opposed races 45 and 46 retaining therebetween an annular series of anti-friction rolling elements 47. The shaft 17 has integral or otherwise rigid therewith beyond its threaded extension 26 a pin 48 of reduced diameter extending into the race 45 and the adjusting screw 41 has its inner end a pin 51 of reduced diameter extending into the race 46.

To permit free adjusting rotation of the screw 41 and to lock said screw in adjusted position, the axial boss 40 on the housing 21 has on one side a lateral extension 52 which is split diametrically of the bore of said boss into two sections 53 and 54. A clamping stud 55 passes freely through the section 53 and is threaded into the other section 54. The housing 21 along the side thereof opposite the lateral extension is also desirably split diametrically of the bore of the boss 40 by a slot 56 to facilitate tightening and loosening of the adjusting screw 41 by the action of the clamping stud 55.

In the operation of the adjustable thrust bearing device described, the spring 30 pressing against the pressure ring 28 urges the plate cylinder 10 axially towards the right. However, the extent to which this cylinder 10 is moved towards the right is determined by the axial position of the adjusting screw 41, since the thrust bearing 43 is pressed by the sleeve 27 against the end of said screw. Through the action of this thrust bearing 43 between the shaft 17 and the adjusting screw 41, said shaft is permitted to rotate without interference from the adjusting screw 41. Since the sleeve 27 is rotating with the cylinder 10, the spring 30 is also rotating therewith. The thrust bearing 31 at the abutment end of the spring 30 permits said spring to so rotate with minimum of interference.

In the drawings, the plate cylinder 10 is shown in its extreme right hand axial position with the pressure ring 28 engaging the inner end of the housing boss 40. When it is desired to adjust the plate cylinder 10 axially towards the left, the clamping stud 55 is loosened and the adjusting screw 41 turned in the appropriate direction for axial movement inwardly. This pushes the thrust bearing 43 towards the left and in turn moves the plate cylinder 10 towards the left against the action of the spring 30.

If the cylinder 10 is in position to the left of the limiting position shown in Fig. 1, and it is desired to adjust the cylinder axially towards the right, the adjusting screw 41 is turned in the appropriate direction for axial movement outwardly. This allows the cylinder 10 to move axially towards the right under the influence of the spring, the extent of this movement being determined by the position of the adjusting screw 41.

The adjustment described may be effected while the cylinder 10 is rotating and may be set by tightening the clamping stud 55.

While the invention has been described with particular reference to a specific embodiment, it is to be understood that it is not to be limited thereto but is to be construed broadly and restricted solely by the scope of the appended claims.

What is claimed is:

1. In combination, a shaft supported for rotation, and a device for adjusting said shaft axially comprising a pressure member mounted on said shaft for axial movement therewith, and including a sleeve embracing a portion of said shaft and having a flange ring, a coil spring around the axis of said shaft having one end pressing against said ring and serving to urge said shaft axially in one direction, an adjusting screw coaxial with said shaft, and a thrust bearing in said sleeve between one end of said adjusting screw and said shaft, said screw being adjustable to allow said shaft to move axially in said direction by the action of said spring or to move said shaft in an opposite direction against the action of said spring.

2. The combination as described in claim 1, said thrust bearing being of the anti-friction type and comprising a race mounted on said shaft and another race mounted on said adjusting screw.

3. In combination, a shaft, a bearing supporting said shaft for rotation, said shaft projecting beyond said bearing, a sleeve threaded on to the projecting part of said shaft and having a flange ring, a coil spring encircling said sleeve and bearing at one end against said flange ring to urge said shaft axially in one direction, an adjusting screw coaxial with said shaft, and an anti-friction thrust bearing between said shaft and said screw, said screw being adjustable to allow said shaft to move axially in said direction by the action of said spring or to move said shaft in an opposite direction against the action of said spring.

4. The combination as described in claim 3, comprising an anti-friction thrust bearing for the other end of said spring to permit said spring to rotate with said shaft.

5. The combination as described in claim 3, said anti-friction thrust bearing being housed in said sleeve and comprising a race embracing a diametrically reduced end of said shaft and another race embracing a diametrically reduced end of said screw.

6. In combination, a shaft supported for rotation, and a device for adjusting said shaft axially comprising a housing into which said shaft extends at one end, said housing having at its outer end a wall with an axially threaded hole therethrough, spring means urging said shaft axially in one direction, a male adjusting screw threaded into said hole and holding said shaft against axial movement in said direction said screw having a turning handle at its outer end outside said housing, said housing at the section where said screw is threaded being split, and a clamping screw passing through the sections of said housing on opposite sides of the split.

7. In combination, a shaft, a bearing supporting said shaft for rotation, said shaft projecting beyond said bearing, and a device for adjusting said shaft axially comprising a housing for the projecting part of said shaft, a sleeve embracing said projecting shaft part and secured thereto for rotation therewith and for axial movement therewith, said sleeve having a pressure flange ring at one end, a coil spring for urging said shaft axially in one direction encircling said sleeve and bearing at one end against said flange ring, an anti-friction thrust bearing for the other end of said spring, whereby said spring is permitted to rotate with said shaft, an adjusting screw coaxial with said shaft and threaded in said housing, and an anti-friction thrust bearing in said sleeve between one end of said shaft and one end of said adjusting screw, said screw being adjustable to allow said shaft to move axially in said direction by the action of said spring or to move said shaft in an opposite direction against the action of said spring.

8. The combination as described in claim 7, said housing at the section where said screw is threaded being split, said combination comprising a clamping screw passing through the sections of said housing on opposite sides of the split.

9. In combination, a shaft supported for rotation, and a device for adjusting said shaft axially comprising a sleeve secured to said shaft and having a flange ring, a coil spring around the axis of said shaft having one end pressing against said flange ring, a thrust bearing for the other end of said coil spring permitting said coil spring to rotate with said shaft, said coil spring urging said shaft axially in one direction, a screw coaxial with said shaft adjustable to allow said shaft to move axially in said direction by the action of said coil spring or to move said shaft in an opposite direction against the action of said coil spring.

10. In combination, a shaft supported for rotation, and a device for adjusting said shaft axially, comprising a housing into which said shaft extends at one end, a coil spring in said housing encircling said shaft and urging said shaft axially outwardly, said housing having an outer end wall retaining said spring in said housing and limiting the extent of outward expansion of said spring, said housing wall being provided with a threaded hole, and a male screw engaging said threaded hole and holding said shaft against outward axial movement, said housing having at its outer wall section where said screw passes being split, and a clamping screw passing through the sections of said housing on opposite sides of the split.

11. In combination, a shaft supported for rotation, and a device for adjusting said shaft axially comprising a housing into which said shaft extends at one end, having an outer end wall, a pressure member in said housing rigid with said shaft, a coil spring in said housing encircling said shaft and urging said shaft axially outwardly, said wall defining an inner axially facing shoulder adapted to be engaged by said pressure member and to limit thereby outward movement of said pressure member under the action of said coil spring, and a screw threaded into said end wall and operable to allow said shaft to move axially outwardly under the action of said coil spring and rotatable to move said shaft inwardly against the action of said coil spring.

LASZLO M. STEMPEL.

REFERENCES CITED

The following references are of record in the file of this patent:

UNITED STATES PATENTS

| Number | Name | Date |
| --- | --- | --- |
| 1,146,740 | Sorenson | July 13, 1915 |
| 2,326,180 | Stempel | Aug. 10, 1943 |

FOREIGN PATENTS

| Number | Country | Date |
| --- | --- | --- |
| 137,600 | Austria | May 11, 1934 |